Patented May 31, 1938

2,118,813

UNITED STATES PATENT OFFICE 2,118,813

MOLDING COMPOSITIONS AND PROCESS FOR PRODUCING THE SAME

Frederick E. Frey and Paul A. Bury, Bartlesville, Okla., assignors to Phillips Petroleum Company, a corporation of Delaware No Drawing. Application July 23, 1935, Serial No. 32,820

3 Claims. (Cl. 106—22)

The present invention relates to the incorporation of inert fillers with the highly polymeric reaction products of sulfur dioxide and olefins, methods of doing the same, and products obtain thereby.

An object of this invention is to increase the mechanical strength, toughness, and machinability of molded products made from sulfur dioxide and olefins by incorporating inert fibrous fillers into the reaction products.

Another object is to modify other properties such as color, opacity, etc., of molded products made from the resinous heteropolymeric products of sulfur dioxide and unsaturated compounds.

A further object is to provide satisfactory methods for incorporating inert fillers with the reaction product.

The use of inert fillers in the manufacture of molding powders from commercial resins has been practiced for several years. In general the filler is incorporated in the resin by mixing the two on heated differential rolls or by heated mixing machinery of the kneading type. As a rule the main incentive to add fillers is that of economy, for by the use of 50 per cent of a cheap filler the cost per pound of a molding composition from an expensive resin can be reduced almost to one half of the cost per pound of the resin. In most cases the mechanical strength of the molded filled resin is about the same as, or noticeably less than, that of the unfilled resin.

We have discovered that when a fibrous inert filler such as ground paper pulp, cotton floc or asbestos, are suitably incorporated with the polymeric products made by reacting sulfur dioxide with olefins, molded products can be made therefrom which have very much higher mechanical strength, toughness, and machinability than the molded unfilled resins. For example, the comparative values for moldings made from filled and unfilled resins are given in the following table.

| Molding from:— | Tensile strength lbs. per sq. in. | Impact strength ft. lb. for an inch sq. |
|---|---|---|
| Pentene-1—SO₂ resin filled | 6408 | 3.94 |
| Pentene-1—SO₂ resin unfilled | 3065 | 1.17 |
| Mixed butene—SO₂ resin filled | 5500 | 4.57 |
| Mixed butene—SO₂ resin unfilled | 4310 | 1.70 |

Certain other fillers such as wood flour, powdered mica, clays and pigments may also be used, to cheapen the product or to modify certain properties such as color and resistance to alkalies. Inasmuch as the cost of manufacture of the olefin-sulfur dioxide resins is comparatively very small, however, the savings effected by the use of fillers is much less than in the case of most commercial resins. The improvement in mechanical strength, toughness, and machinability is consequently the most important advantage to be gained by the use of fillers.

The filler may be incorporated with the olefin-sulfur dioxide resins in several ways. The resin may be formed in and around the filler by adding the mixture of sulfur dioxide, olefin and catalyst to the filler in a suitable pressure vessel agitating during the reaction in order to keep the filler more uniformly mixed with the resin, eliminating unreacted sulfur dioxide and hydrocarbons at the end of the reaction, and grinding the solid filled resin to a suitable molding powder. As a variation of this process the filler may be first impregnated with the catalyst or a solution thereof in place of dissolving the catalyst in the sulfur dioxide-olefin mixture. As is well known the reaction between sulfur dioxide and olefin can be promoted by actinic light but this would be very difficult and slow in the presence of high concentrations of opaque fillers.

Another method comprises carrying out the reaction of olefin and sulfur dioxide, either photochemically or catalytically, in a two-fold, or larger, excess of sulfur dioxide and working the filler into the resulting viscous solution of resin in sulfur dioxide. As a variation, the reaction can be carried out with a smaller excess of sulfur dioxide and the viscosity of the resulting solution can then be reduced by addition of more sulfur dioxide before working in the filler. After the filler is thoroughly mixed with the solution, most of the excess sulfur dioxide is removed, suitably by evaporation, and the resulting solid filled resin is ground by the usual methods to a suitable molding powder. The molding powder will usually require some further treatment, such as warming in a slow stream of gas, to remove the last traces of sulfur dioxide.

Another method comprises dissolving the solid resin, prepared in the usual manner by reacting the sulfur dioxide and olefins catalytically or photochemically, eliminating the unreacted hydrocarbons and sulfur dioxide, and preferably crushing or grinding, in a suitable organic solvent, such as nitromethane or 1-4 dioxane; impregnating the filler with the resulting solution; evaporating the solvent therefrom; and grinding the filled resin by the usual means to a suitable molding powder.

All the methods described above depend on the solubility of the resin in liquid sulfur dioxide or organic solvents, and hence cannot be conveniently applied to reaction products such as those obtained from propylene, ethylene, isopropylethylene, isobutylene and several diolefins; which are practically insoluble in liquid sulfur dioxide and volatile organic solvents. They can be applied, however, to resins obtained by reacting sulfur dioxide with 1- and 2-olefins of 4 or more carbon atoms, unsaturated alcohols, some unsaturated ethers, unsaturated acids, some unsaturated halogen compounds, and most mixtures of olefins.

A more generally applicable method comprises mixing the pulverized resin with the filler in a ball mill or rod mill. About the only resins which cannot be conveniently treated by this method are those which are plastic or semiplastic at ordinary temperatures, such as are the resins made by reacting sulfur dioxide with unsaturated carboxylic acids, unsaturated esters, and mono-olefins of more than nine carbon atoms per molecule.

As a further method the filler may be incorporated with the solid resin on steam heated rolls.

The proportion of the filler used may be varied widely but we prefer to use 10–60 per cent depending on the nature of the filler and the purpose for which it is used.

The methods of practicing the present invention are illustrated by the following examples:

1. A mixture of 2 pounds butene-2, 1 pound butene-1, 15 pounds sulfur dioxide, 100 cc. of a 5 per cent solution of lithium nitrate in absolute alcohol, and 4 pounds of ground paper pulp are charged to an autoclave fitted with a stirrer and a large outlet valve and pipe near the bottom. The mixture is agitated until the reaction is practically complete as indicated by absence of free olefins in the mixture. At that time, either most of the excess sulfur dioxide is withdrawn as a vapor from the autoclave and the solid filled resin is removed later, or the viscous solution is withdrawn from the bottom of the reaction chamber into an expansion chamber from which the sulfur dioxide can be recovered and the solid filled resin is later removed. The solid filled resin is thereafter ground by usual methods to a suitable molding powder, and is then preferably freed from traces of sulfur dioxide before molding.

2. Six pounds of pulverized solid resin made by reacting pentene-1 with sulfur dioxide is ground in a ball mill for 3 hours with 4 pounds of ground paper pulp. The mixture is removed from the ball mill and is preferably freed from traces of sulfur dioxide by warming in vacuum or by exposure in a thin layer to a slow stream of warm gas, before molding.

3. One pound of solid resin made by reacting sulfur dioxide with olefins contained in the 4-carbon-atom fraction of vapors from a liquid-phase cracking still is dissolved in 4 pounds of 1-4 dioxane. One pound of asbestos fibre is stirred into the solution and the solvent is evaporated. The resulting filled resin is then ground to a molding powder.

4. Almost any of the commercial pigments such as carbon black, titanium oxide or lithopane whites, chrome yellows and greens, iron, selenium or antimony reds, ultramarine or Prussian blues may be used as combined color and filler as follows: Two pounds of ground resin made by reacting olefins and sulfur dioxide are kneaded with 1½ ounces of titanium oxide pigment on heated differential rolls for 2 minutes. The mixture is removed from the rolls, cooled and ground to a suitable molding powder. Pigments can also be incorporated by the methods illustrated in Examples 1, 2 and 3.

The expression "unsaturated body" used in the following claims is intended to include all unsaturated compounds which react with sulfur dioxide to form heteropolymeric compounds of high molecular weight possessing thermoplastic properties.

Having described our invention, we claim:

1. In a process for the production of heteropolymeric reaction products of sulfur dioxide and olefins, in which the reaction is carried out in the presence of a suitable catalyst, the improvement which comprises impregnating an inert fibrous filler material with said catalyst and incorporating the catalyst impregnated filler in the reaction mixture.

2. A process for incorporating an inert fibrous filler with the heteropolymeric reaction products of sulfur dioxide and an olefin, which comprises impregnating said filler material with a catalyst for the olefin-sulfur dioxide reaction, intimately mixing said impregnated filler with the sulfur dioxide and olefin, whereby the reaction is promoted by said catalyst and a product having said filler incorporated therein is produced.

3. A process of incorporating an inert fibrous filling material with the heteropolymeric reaction products of sulfur dioxide and an olefin which comprises impregnating said filling material with a catalyst for the reaction, mixing said impregnated filling material with the sulfur dioxide and olefin, carrying out the reaction while agitating to keep the filling material uniformly suspended, and eliminating any unreacted materials by vaporization.

FREDERICK E. FREY.
PAUL A. BURY.